US009647739B2

(12) United States Patent
Chen et al.

(10) Patent No.: US 9,647,739 B2
(45) Date of Patent: May 9, 2017

(54) METHOD AND DEVICE FOR ACQUIRING CHANNEL INFORMATION (71) Applicant: ZTE Corporation, Shenzhen, Guangdong (CN)

(72) Inventors: Xianming Chen, Shenzhen (CN); Dengkui Zhu, Shenzhen (CN); Huahua Xiao, Shenzhen (CN); Zhaohua Lu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/906,010

(22) PCT Filed: May 20, 2014

(86) PCT No.: PCT/CN2014/077937
§ 371 (c)(1),
(2) Date: Jan. 19, 2016

(87) PCT Pub. No.: WO2014/166454
PCT Pub. Date: Oct. 16, 2014

(65) Prior Publication Data
US 2016/0156399 A1 Jun. 2, 2016

(30) Foreign Application Priority Data

Jul. 22, 2013 (CN) .......................... 2013 1 0309285

(51) Int. Cl.
H04B 7/02 (2006.01)
H04B 7/04 (2017.01)
(Continued)

(52) U.S. Cl.
CPC ......... *H04B 7/0478* (2013.01); *H04B 7/0413* (2013.01); *H04B 7/0417* (2013.01);
(Continued)

(58) Field of Classification Search
CPC .. H04B 7/0626; H04B 7/0413; H04B 7/0417; H04B 7/0478; H04L 5/0048; H04L 25/0204; H04L 25/0228; H04L 25/0242
(Continued)

(56) References Cited

U.S. PATENT DOCUMENTS 8,086,242 B2 12/2011 Kent
8,463,210 B2 6/2013 Lee
(Continued)

FOREIGN PATENT DOCUMENTS

CN 101272170 A 9/2008
CN 101808064 A * 8/2010
CN 102334300 A 1/2012

OTHER PUBLICATIONS

International Search Report in international application No. PCT/CN2014/077937, mailed on Jul. 23, 2014.
(Continued)

Primary Examiner — Helene Tayong
(74) Attorney, Agent, or Firm — Oppedahl Patent Law Firm LLC (57) ABSTRACT The present disclosure discloses a method and device for acquiring channel information, and relates to a massive antenna array transmission technology. The method includes that: a receiving side acquires indexes L of M antennae which send reference signals in N antennae of a sending side; channel information Y between the M antennae and a receiving antenna of the receiving side is acquired; a unitary matrix W with a dimension of N×N is acquired; and an estimate S' of channel information S between the N antennae of the sending side and the receiving antenna of the receiving side is determined by virtue of the indexes L, the unitary matrix W and the channel information Y.

21 Claims, 4 Drawing Sheets (51) Int. Cl.
- *H04B 7/06* (2006.01)
- *H04L 5/00* (2006.01)
- *H04L 25/02* (2006.01)
- *H04B 7/0413* (2017.01)
- *H04B 7/0417* (2017.01)

(52) U.S. Cl.
CPC ......... *H04B 7/0626* (2013.01); *H04L 5/0048* (2013.01); *H04L 25/0204* (2013.01); *H04L 25/0228* (2013.01); *H04L 25/0242* (2013.01)

(58) Field of Classification Search
USPC ......................................... 375/267, 259, 260
See application file for complete search history.

(56) References Cited

U.S. PATENT DOCUMENTS

| | | |
|---|---|---|
| 2008/0233965 A1 | 9/2008 | Kent |
| 2011/0281536 A1 | 11/2011 | Lee |
| 2012/0082128 A1 | 4/2012 | Kent |
| 2012/0288022 A1 | 11/2012 | Guey |
| 2013/0083865 A1* | 4/2013 | Wu ..................... H04B 7/0617 375/267 |
| 2013/0163645 A1 | 6/2013 | Kuo |
| 2014/0219377 A1 | 8/2014 | Guey |
| 2015/0124736 A1* | 5/2015 | Ko ..................... H04B 7/0626 370/329 |

OTHER PUBLICATIONS

English Translation of the Written Opinion of the International Search Authority in international application No. PCT/CN2014/077937, mailed on Jul. 23, 2014.

Supplementary European Search Report in European application No. 14783089.7, mailed on May 11, 2016.

Ping-Heng Kuo et al:"Compressive sensing based channel feedback protocols for spatially-correlated massive antenna arrays"11,2012 IEEE Wireless Communications and Networking Conference (WCNC), Apr. 1, 2012, pp. 492-497,XP055257974.

* cited by examiner

METHOD AND DEVICE FOR ACQUIRING CHANNEL INFORMATION

TECHNICAL FIELD

The present disclosure relates to a transmission technology for massive antenna array, and in particular to a method and device for acquiring channel information for a receiving side in a wireless communication system employing a massive antenna array.

BACKGROUND

Along with rise of smart terminals and mobile social networks, the requirements for mobile communication service traffic explosively increase. A Beyond Fourth Generation/Fifth Generation (B4G/5G) mobile communication system in the future will be confronted with a massive information transmission requirement and a ubiquitous coverage requirement. Adoption of an advanced multi-antenna technology, a channel adaptive technology and the like in a Fourth Generation (4G) mobile communication standard has made spectral efficiency of a system approach to channel capacity, and it is necessary to change a conventional network architecture and find a new radio resource growth point to achieve the purpose. Cell miniaturization and isomerization is a development trend of a wireless network in the future, and a distance between a terminal and an access point may be shortened to remarkably reduce path loss of a signal, thereby improving the spectral efficiency and power efficiency of the system and facilitating enhancement of network coverage; and however, a complex interference problem needs to be solved. On the other hand, configuration of a more massive antenna array is considered as another low-cost implementation manner capable of remarkably improving system capacity and coverage.

A high-dimensional antenna arrangement-based massive antenna array technology is one of hot research directions which rise in recent two years. Latest researches have shown that: an adaptive massive antenna array technology may deeply excavate and utilize spatial radio resources, may remarkably improve spectral efficiency and power efficiency of a system theoretically, and is an important technology for constructing a high-performance green broadband mobile communication system in the future. But how to completely excavate its potential gain is urgent to be deeply researched. Moreover, adaptive massive antenna array transmission may present some new characteristics, for example: spatial distribution of channels is obviously sparse; massive array beams may almost completely eliminate influence of noise, but same-frequency interference caused by pilot pollution and the like becomes a major factor which restricts system performance; and performance of an adaptive massive antenna array mainly depends on a statistical characteristic of a channel, and influence of small-scale fading of the channel is obviously reduced.

In order to design a novel efficient and reliable transmission technology for massive antenna array for adaptation to the characteristics, it is necessary to solve a problem about acquisition of channel information on a receiving side at first. Based on an existing method for acquiring channel information, sharp increase of the number of antennae on a sending side may inevitably cause sharp increase in overhead of reference signals configured for channel information acquisition, and in other words, the existing method for acquiring channel information inhibits further improvement in spectral efficiency of massive antenna array transmission. A problem about the overhead of the reference signal configured for channel information acquisition is a bottleneck problem, which is required to be solved, of a massive antenna array system. Therefore, seeking for a novel method for acquiring channel information applicable to a massive antenna array wireless communication system has high theoretical value and practical significance for construction of a practical massive antenna array transmission system.

SUMMARY

In order to solve the existing technical problem, the embodiments of the present disclosure provide a method and device for acquiring channel information.

An embodiment of the present disclosure provides a method for acquiring channel information, which may include that:

a receiving side acquires indexes L of M antennae which send reference signals in N antennae of a sending side;

channel information Y between the M antennae and a receiving antenna of the receiving side is acquired;

a unitary matrix W with a dimension of N×N is acquired; and an estimate S' of channel information S between the N antennae of the sending side and the receiving antenna of the receiving side is determined by virtue of the indexes L, the unitary matrix W and the channel information Y.

Preferably, the step that the receiving side acquires the indexes L of the M antennae which send the reference signals in the N antennae of the sending side may include that:

the receiving side acquires intrinsic indexes L of the M antennae, or acquires the indexes L of the M antennae according to time and/or frequency resource locations, or acquires the indexes L of the M antennae through first system or control information from the sending side.

Preferably, the receiving side may directly acquire the indexes L of the M antennae in the first system or control information, or acquire the indexes L of the M antennae through antenna array indexes in the first system or control information.

Preferably, the step that the channel information Y between the M antennae and the receiving antenna of the receiving side is acquired may include that:

the receiving side acquires channel information $\{y_1, y_2, \ldots, y_M\}$ between each antenna in the M antennae and the receiving antenna according to reference data and received data at a reference signal resource location of each antenna in the M antennae; and the channel information $\{y_1, y_2, \ldots, y_M\}$ between each antenna in the M antennae and the receiving antenna is combined to obtain the channel information Y.

Preferably, the step that the unitary matrix W with the dimension of N×N is acquired may include that:

the receiving side acquires the unitary matrix W which is predetermined, or determines the unitary matrix W through second system or control information from the sending side.

Preferably, the unitary matrix W which is predetermined may be a Discrete Fourier Transform (DFT) matrix with a dimension of N×N, and each element of the unitary matrix W may be:

$$W_{pq} = C \cdot \exp\left(j2\pi\frac{(p-1)(q-1)}{N}\right);$$

-continued $p = 1, 2, \ldots, N;$ $q = 1, 2, \ldots, N$ where p and q represent a row index and a column index of the unitary matrix W respectively, and C is a normalized constant factor.

Preferably, the second system or control information may include an antenna element number $N_v$ in a vertical direction, an antenna element number $N_h$ in a horizontal direction, a polarized antenna element indicator and related information about a polarized matrix $W_{pol}$.

Preferably, the step that the unitary matrix W is determined through the second system or control information from the sending side may include that:

the unitary matrix W with the dimension of N×N is determined by calculating a kronecker product of a DFT matrix $W_v$ with a dimension of $N_v \times N_v$ in the vertical direction, the polarized matrix $W_{pol}$ and a DFT matrix $W_h$ with a dimension of $N_h \times N_h$ in the horizontal direction, wherein when it is determined, according to the polarized antenna element indicator, that the N antennae of the sending side are single-polarized antenna elements, a product of $N_v$ and $N_h$ is N and $W_{pol}$ is a scalar 1; and when it is determined, according to the polarized antenna element indicator, that the N antennae of the sending side are dual-polarized antenna elements, twice of the product of $N_v$ and $N_h$ is N and $W_{pol}$ is a polarized matrix with a dimension of 2×2.

Preferably, the step that the estimate S' of the channel information S between the N antennae of the sending side and the receiving antenna of the receiving side is determined by virtue of the indexes L, the unitary matrix W and the channel information Y may include that:

the receiving side acquires a random matrix P with a dimension of M×N by virtue of the indexes L;

a vector X is determined by virtue of the random matrix P, the unitary matrix W and the channel information Y; and the estimate S' of the channel information S between the N antennae and the receiving antenna is determined by virtue of the unitary matrix W and the vector X.

Preferably, an $i_m$th element in an mth row of the random matrix P may be 1 and other elements may be 0, wherein the $i_m$ is an antenna index of the mth antenna in the M antennae, and m=1, 2, ..., M.

Preferably, the vector X may be a vector with a smallest norm in a vector set $\{V_1, V_2, \ldots, V_K\}$, wherein any vector $V_i$ in the vector set $\{V_1, V_2, \ldots, V_K\}$ meets that: a product of the random matrix P, the unitary matrix W or a conjugate transpose of the unitary matrix W and the vector $V_i$ is equal to the channel information Y, and the norm is a sum of absolute values of all elements of the vector.

Preferably, the estimate S' of the channel information S between the N antennae and the receiving antenna may be determined by calculating a product of the unitary matrix W or the conjugate transpose of the unitary matrix W and the vector X.

An embodiment of the present disclosure further provides a device for acquiring channel information, which may include:

an information acquisition module, configured to acquire indexes L of M antennae which send reference signals in N antennae of a sending side, acquire channel information Y between the M antennae and a receiving antenna of a receiving side, and acquire a unitary matrix W with a dimension of N×N; and a channel information estimation module, configured to determine an estimate S' of channel information S between the N antennae of the sending side and the receiving antenna of the receiving side by virtue of the indexes L, the unitary matrix W and the channel information Y.

Preferably, the channel information acquisition module may include an antenna index acquisition sub-module, a channel information acquisition sub-module and a unitary matrix acquisition sub-module, wherein the antenna index acquisition sub-module may be configured to acquire intrinsic indexes L of the M antennae, or acquire the indexes L of the M antennae according to time and/or frequency resource locations, or acquire the indexes L of the M antennae through first system or control information from the sending side;

the channel information acquisition sub-module may be configured to acquire channel information $\{y_1, y_2, \ldots, y_M\}$ between each antenna in the M antennae and the receiving antenna according to reference data and received data at a reference signal resource location of each antenna in the M antennae, and combine the channel information $\{y_1, y_2, \ldots, y_M\}$ between each antenna in the M antennae and the receiving antenna to obtain the channel information Y; and the unitary matrix acquisition sub-module may be configured to acquire the unitary matrix W which is predetermined, or determine the unitary matrix W through second system or control information from the sending side.

Preferably, the second system or control information may include an antenna element number $N_v$ in a vertical direction, an antenna element number $N_h$ in a horizontal direction, a polarized antenna element indicator and related information about a polarized matrix $W_{pol}$.

Preferably, the operation that the unitary matrix acquisition sub-module determines the unitary matrix W through the second system or control information from the sending side may include that:

the unitary matrix acquisition sub-module determines the unitary matrix W with the dimension of N×N by calculating a kronecker product of a DFT matrix $W_v$ with a dimension of $N_v \times N_v$ in the vertical direction, the polarized matrix $W_{pol}$ and a DFT matrix $W_h$ with a dimension of $N_h \times N_h$ in the horizontal direction, wherein when it is determined, according to the polarized antenna element indicator, that the N antennae of the sending side are single-polarized antenna elements, a product of $N_v$ and $N_h$ is N and $W_{pol}$ is a scalar 1; and when it is determined, according to the polarized antenna element indicator, that the N antennae of the sending side are dual-polarized antenna elements, twice of the product of $N_v$ and $N_h$ is N and $W_{pol}$ is a polarized matrix with a dimension of 2×2.

Preferably, the channel information estimation module may include a random matrix acquisition sub-module, a vector determination sub-module and an estimation sub-module, wherein the random matrix acquisition sub-module may be configured to acquire a random matrix P with a dimension of M×N by virtue of the indexes L;

the vector determination sub-module may be configured to determine a vector X by virtue of the random matrix P, the unitary matrix W and the channel information Y; and the estimation sub-module may be configured to determine the estimate S' of the channel information S between the N antennae and the receiving antenna by virtue of the unitary matrix W and the vector X.

Preferably, an $i_m$th element in an mth row of the random matrix P is 1 and other elements are 0, wherein the $i_m$ is an antenna index of the mth antenna in the M antennae, and m=1, 2, . . . , M.

Preferably, the vector X may be a vector with a smallest norm in a vector set $\{V_1, V_2, \ldots, V_K\}$, wherein any vector $V_i$ in the vector set $\{V_1, V_2, \ldots, V_K\}$ meets that: a product of the random matrix P, the unitary matrix W or conjugate transpose of the unitary matrix W and the vector $V_i$ is equal to the channel information Y, and the norm is a sum of absolute values of all elements of the vector.

Preferably, the estimation sub-module may be configured to determine the estimate S' of the channel information S between the N antennae and the receiving antenna by calculating a product of the unitary matrix W or a conjugate transpose of the unitary matrix W and the vector X.

An embodiment of the present disclosure further provides a computer-readable storage medium, which may include a set of computer-executable instructions, the instructions being configured to execute the method for acquiring channel information of the embodiment of the present disclosure.

Compared with a related art, the embodiments of the present disclosure have beneficial effects as follows:

according to the embodiments of the present disclosure, the estimate S' of channel information S between N antennae and a receiving antenna is acquired according to channel information Y between M antennae which send reference signals in the N antennae and the receiving antenna, which reduces overhead of the reference signals, used for channel information acquisition, of a massive antenna array, thereby further improving spectral efficiency of massive antenna array transmission.

DETAILED DESCRIPTION

Preferred embodiments of the present disclosure are described below with reference to the drawings in detail, and it should be understood that the preferred embodiments described below are only adopted to describe and explain the present disclosure and not intended to limit the present disclosure.

Figure 1:
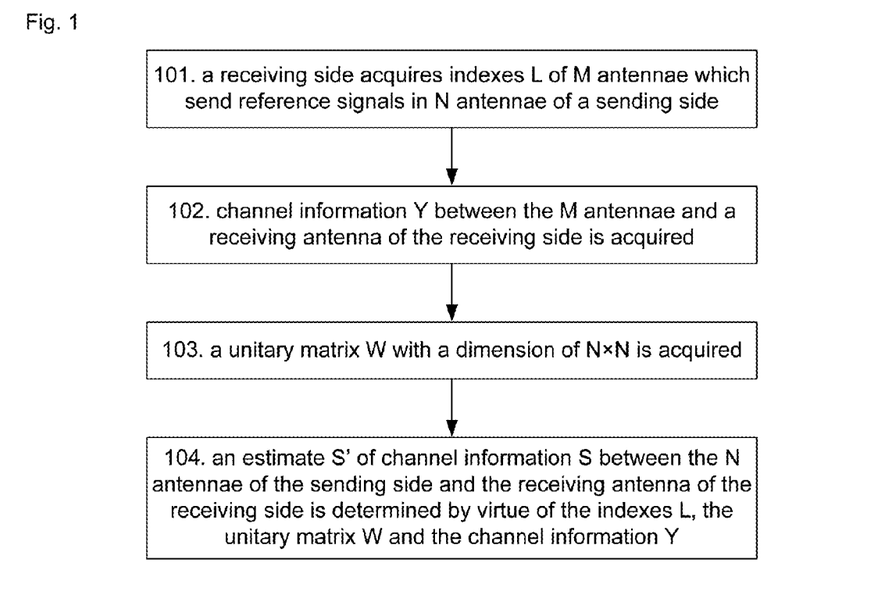
FIG. 1 is a flowchart of a method for acquiring channel information according to an embodiment of the present disclosure.

FIG. 1 is a flowchart of a method for acquiring channel information according to an embodiment of the present disclosure. As shown in FIG. 1, the method includes:

step 101: a receiving side acquires indexes L of M antennae which send reference signals in N antennae of a sending side. Specifically, the receiving side acquires intrinsic indexes L of the M antennae, that is, the indexes L are kept unchanged along with changes of time and/or frequency resource locations; or the receiving side acquires the indexes L of the M antennae in a predetermined manner according to the time and/or frequency resource locations; or the receiving side acquires the indexes L of the M antennae through first system or control information from the sending side, that is, the receiving side directly acquires the indexes L of the M antennae from the first system or control information, or acquires the indexes L of the M antennae through antenna array indexes in the first system or control system;

step 102: channel information Y between the M antennae and a receiving antenna of the receiving side is acquired; specifically, the receiving side acquires channel information $\{y_1, y_2, \ldots, y_M\}$ between each antenna in the M antennae and the receiving antenna according to reference data and received data at a reference signal resource location (i.e. the time and/or frequency resource locations of the reference signals) of each antenna in the M antennae, and then combines the channel information $\{y_1, y_2, \ldots, y_M\}$ between each antenna in the M antennae and the receiving antenna to obtain the channel information Y, wherein the reference data is transmitted data at the known time and/or frequency resource locations of the reference signals of each antenna in the M antennae of the receiving side;

step 103: the receiving side acquires a unitary matrix W with a dimension of N×N; specifically, the receiving side acquires the unitary matrix W which is predetermined, or determines the unitary matrix W through second system or control information from the sending side; the unitary matrix W which is predetermined is a DFT matrix with a dimension of N×N, and each element of the unitary matrix W is:

$$W_{pq} = C \cdot \exp\left(j2\pi \frac{(p-1)(q-1)}{N}\right);$$
$$p = 1, 2, \ldots, N;$$
$$q = 1, 2, \ldots, N$$

where p and q represent a row index and a column index of the unitary matrix W respectively, and C is a normalized constant factor.

The second system or control information includes an antenna element number $N_v$ in a vertical direction, an antenna element number $N_h$ in a horizontal direction, a polarized antenna element indicator and related information about a polarized matrix $W_{pol}$, and the receiving side determines the unitary matrix W with the dimension of N×N by calculating a kronecker product of a DFT matrix $W_v$ with a dimension of $N_v \times N_v$ in the vertical direction, the polarized matrix $W_{pol}$ and a DFT matrix $W_h$ with a dimension of $N_h \times N_h$ in the horizontal direction, wherein, when it is determined, according to the polarized antenna element indicator, that the N antennae of the sending side are single-polarized antenna elements, a product of $N_v$ and $N_h$ is N and $W_{pol}$ is a scalar 1; and when it is determined, according to the polarized antenna element indicator, that the N antennae of the sending side are dual-polarized antenna elements, twice of the product of $N_v$ and $N_h$ is N and $W_{pol}$ is a polarized matrix with a dimension of 2×2; and step 104: the receiving side determines an estimate S' of channel information S between the N antennae of the sending side and the receiving antenna of the receiving side by virtue of the indexes L, the unitary matrix W and the channel information Y; specifically, the receiving side acquires a random matrix with a dimension of M×N by virtue of the indexes L of the M antennae, the $i_m$th element in the mth row of the random matrix P being 1 and other elements being 0, wherein $i_m$th is an antenna index of the mth antenna in the M antennae, and m=1, 2, . . . , M; then a vector X is determined by virtue of the random matrix P, the unitary matrix W and the channel information Y, the vector X being a vector with a smallest norm in a vector set $\{V_1, V_2, \ldots, V_K\}$, wherein any vector $V_i$ in the vector set $\{V_1, V_2, \ldots, V_K\}$ meets that: a product of the random matrix P, the unitary matrix W or the conjugate transpose of the unitary matrix W and the vector V; is equal to the channel information Y, and the norm is a sum of absolute values of all elements of the vector; and finally, the estimate S' of the channel information S between the N antennae and the receiving antenna is determined by virtue of the unitary matrix W and the vector X, and preferably, the estimate S' of the channel information S between the N antennae and the receiving antenna is determined by calculating a product of the unitary matrix W or the conjugate transpose of the unitary matrix W and the vector X.

Figure 2:
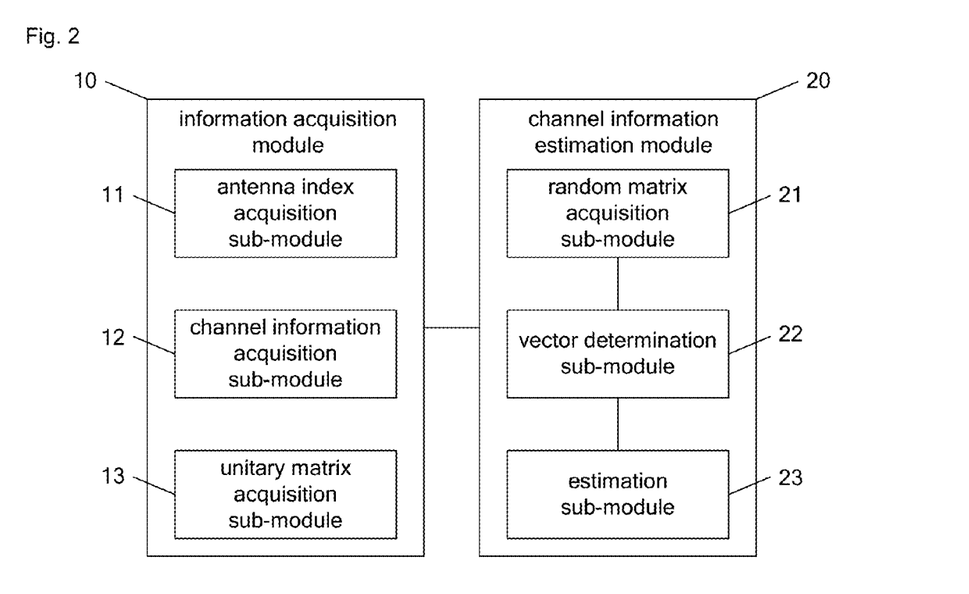
FIG. 2 is a structure diagram of a device for acquiring channel information according to an embodiment of the present disclosure.

An embodiment of the present disclosure further provides a device for acquiring channel information. As shown in FIG. 2, the device includes an information acquisition module 10 and a channel information estimation module 20, wherein:

the information acquisition module 10 is configured to acquire indexes L of M antennae which send reference signals in N antennae of a sending side, acquire channel information Y between the M antennae and a receiving antenna of a receiving side, and acquire a unitary matrix W with a dimension of N×N.

Here, the information acquisition module 10 includes an antenna index acquisition sub-module 11, a channel information acquisition sub-module 12 and a unitary matrix acquisition sub-module 13.

The antenna index acquisition sub-module 11 is configured to acquire intrinsic indexes L of the M antennae, or acquire the indexes L of the M antennae according to time and/or frequency resource locations, or acquire the indexes L of the M antennae through first system or control information from the sending side;

the channel information acquisition sub-module 12 is configured to acquire channel information $\{y_1, y_2, \ldots, y_M\}$ between each antenna in the M antennae and the receiving antenna according to reference data and received data at a reference signal resource location of each antenna in the M antennae, and combine the channel information $\{y_1, y_2, \ldots, y_M\}$ between each antenna in the M antennae and the receiving antenna to obtain the channel information Y; and the unitary matrix acquisition sub-module 13 is configured to acquire the unitary matrix W which is predetermined, or determine the unitary matrix W through second system or control information from the sending side.

The channel information estimation module 20 is configured to determine an estimate S' of channel information S between the N antennae of the sending side and the receiving antenna of the receiving side by virtue of the indexes L, the unitary matrix W and the channel information Y.

The channel information estimation module 20 includes a random matrix acquisition sub-module 21, a vector determination sub-module 22 and an estimation sub-module 23.

The random matrix acquisition sub-module 21 is configured to acquire a random matrix P with a dimension of M×N by virtue of the indexes L of the M antennae, the $i_m$th element in the mth row of the random matrix P being 1 and other elements being 0, wherein $i_m$ is an antenna index of the mth antenna in the M antennae, and m=1, 2, . . . , M;

the vector determination sub-module 22 is configured to determine a vector X by virtue of the random matrix P, the unitary matrix W and the channel information Y, where the vector X is a vector with a smallest norm in a vector set $\{V_1, V_2, \ldots, V_K\}$ and a product of the random matrix P, the unitary matrix W or the conjugate transpose of the unitary matrix W and any vector $V_i$ in the vector set $\{V_1, V_2, \ldots, V_K\}$ is equal to the channel information Y; and the estimation sub-module 23 is configured to determine the estimate S' of the channel information S between the N antennae and the receiving antenna by virtue of the unitary matrix W and the vector X.

It is to be noted that the information acquisition module 10 and the channel information estimation module 20 may be implemented by a Central Processing Unit (CPU), a Micro Processing Unit (MPU), a Digital Signal Processor (DSP) or a Field Programmable Gate Array (FPGA) in the device for acquiring channel information.

The present disclosure is further elaborated below with reference to FIG. 3 to FIG. 9 and specific embodiments. It is to be noted that the embodiments in the present disclosure and characteristics in the embodiments can be combined if there is no conflict.

It is supposed that an antenna array consists of a plurality of antenna elements and the dimension of the antenna array is $N_v \times N_h$, that is, the number of antenna elements in a vertical direction or the number of rows of the antenna elements is $N_v$, and the number of antenna elements in a horizontal direction or the number of columns of the antenna elements is $N_h$.

Figure 3:
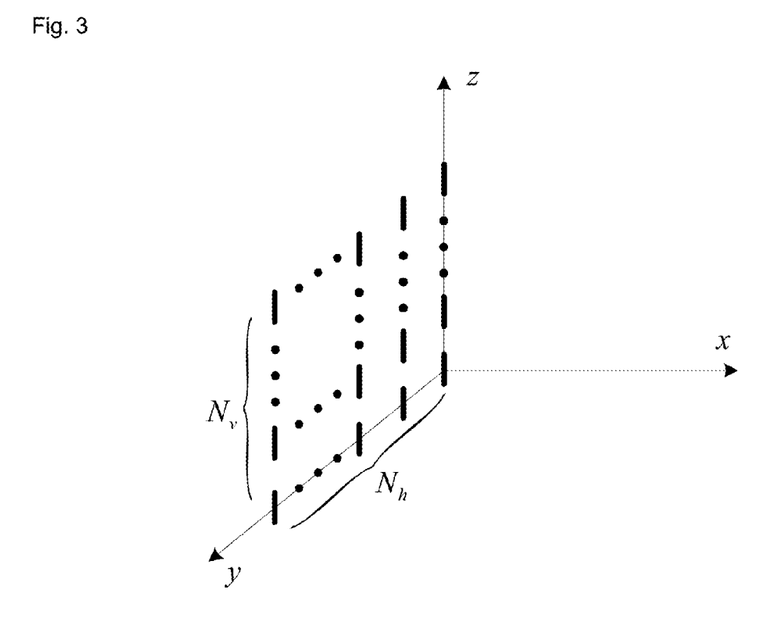
FIG. 3 is a diagram of a massive planar single-polarized antenna array according to an embodiment of the present disclosure.
Figure 4:
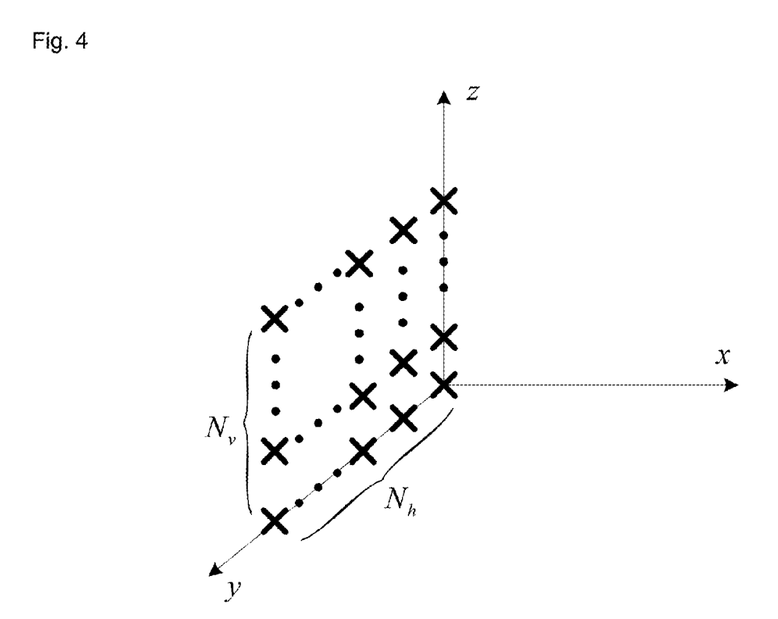
FIG. 4 is a diagram of a massive planar dual-polarized antenna array according to an embodiment of the present disclosure.

It is supposed that the antenna elements are divided into single-polarized antenna elements and dual-polarized antenna elements, wherein each single-polarized antenna element is equivalent to one antenna, and an antenna array consisting of single-polarized antenna elements is called a single-polarized antenna array; and each dual-polarized antenna element is equivalent to two antennae with different polarization directions, and an antenna array consisting of dual-polarized antenna elements is called a dual-polarized antenna array. FIG. 3 is a diagram of a massive planar single-polarized antenna array according to an embodiment of the present disclosure, and FIG. 3 shows a single-polarized antenna array with a dimension of $N_v \times N_h$, wherein the product of the antenna element number $N_v$ in a vertical direction and the antenna element number $N_h$ in a horizontal direction is equal to the antenna number N of a sending side. FIG. 4 is a diagram of a massive planar dual-polarized antenna array according to an embodiment of the present disclosure, and FIG. 4 shows a dual-polarized antenna array with a dimension of $N_v \times N_h$, wherein twice of the product of the antenna element number $N_v$ in a vertical direction and the antenna element number $N_h$ in a horizontal direction is equal to the antenna number N of a sending side.

It is supposed that an antenna consists of at least one antenna array element with the same polarization direction, and the antenna may be equivalent to an antenna port in a Long Term Evolution (LTE) standard, wherein the antenna array element is a minimum component constituting the antenna.

It is supposed that channel information is a numerical indicator of a small-scale channel or a fast fading channel between a sending antenna and a receiving antenna.

Figure 5:
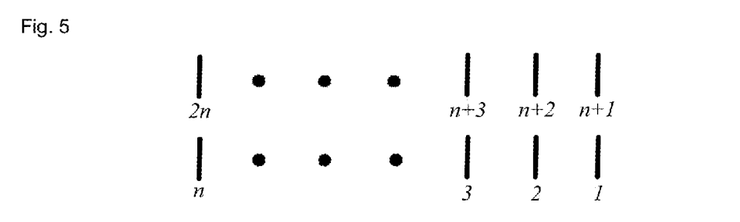
FIG. 5 is a diagram of antenna indexes of a planar single-polarized antenna array according to an embodiment of the present disclosure.
Figure 6:
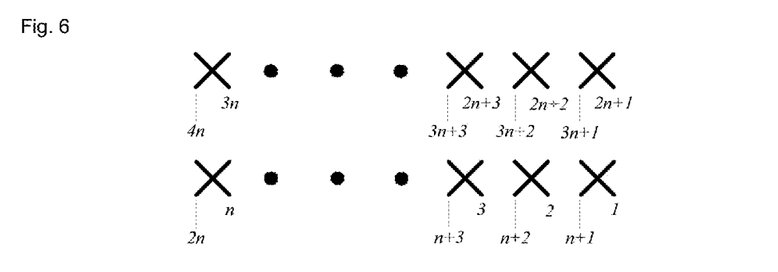
FIG. 6 is a diagram of antenna indexes of a planar dual-polarized antenna array according to an embodiment of the present disclosure.

FIG. 5 is a diagram of antenna indexes of a planar single-polarized antenna array according to an embodiment of the present disclosure. As shown in FIG. 5, antennae in the first row are indexed at first, sequentially being 1, 2, . . . , n from right to left; then antennae in the second row are indexed, sequentially being n+1, n+2, . . . , 2n from right to left, and so on, and the indexing is performed by row. FIG. 6 is a diagram of antenna indexes of a planar dual-polarized antenna array according to an embodiment of the present disclosure. As shown in FIG. 6, antennae with a first polarization direction in the first row are indexed at first, sequentially being 1, 2, . . . , n from right to left; then antennae with a second polarization direction in the first row are indexed, sequentially being n+1, n+2, . . . , 2n from right to left; antennae with the first polarization direction in the second row are indexed next, sequentially being 2n+1, 2n+2, . . . , 3n from right to left; antennae with the second polarization direction in the second row are indexed later on, sequentially being 3n+1, 3n+2, . . . , 4n from right to left, and so on, and the indexing is performed by row by polarization.

An embodiment of the present disclosure provides a method for acquiring channel information, which includes the following four steps.

Step 1: indexes L of M antennae which send reference signals in N antennae are acquired, wherein N is the number of antennae of a sending side, and M is less than or equal to N.

1: A receiving side may acquire intrinsic indexes L of the M antennae, wherein the M antennae which send the reference signals in the N antennae may not change along with time and/or frequency.

Figure 7:
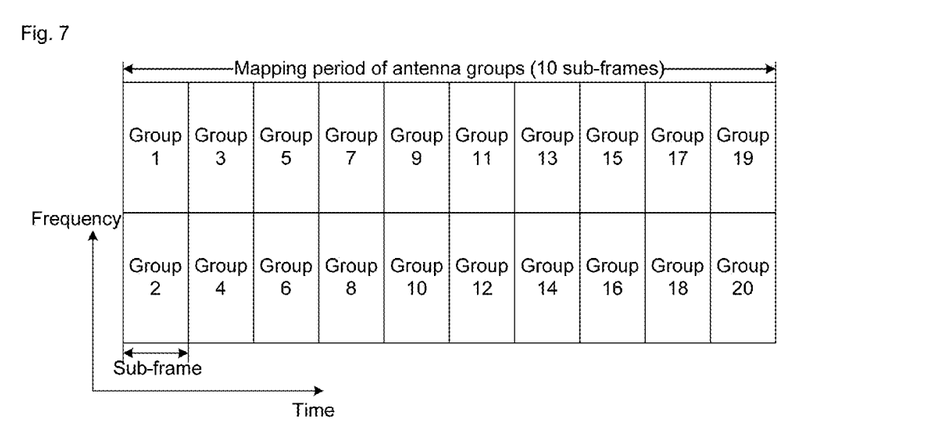
FIG. 7 is a diagram of mapping of antenna groups to time and/or frequency resources according to an embodiment of the present disclosure.

2: The receiving side may acquire the indexes L of the M antennae in a predetermined manner, and at this moment, the indexes L of the M antennae are related to time and/or frequency resource locations. For example, the N antennae may be grouped, each antenna group includes M antennae, and the antennae in different groups are allowed to be partially overlapped; and then, the antenna groups are periodically mapped to corresponding time and/or frequency resources. FIG. 7 is a diagram of mapping of antenna groups to time and/or frequency resources according to an embodiment of the present disclosure. As shown in FIG. 7, there are totally 20 antenna groups, and the antenna groups are mapped by taking a duration of 10 sub-frames as a period. Preferably, it is supposed that N is an integral multiple of M, the N antennae are divided into N/M groups, specifically, every M antennae are sequentially selected to form an antenna group at an interval of N/M, and the N/M antenna groups are cyclically mapped to the corresponding time and/or frequency resources.

3. The indexes L of the M antennae are acquired by receiving information from the sending side, wherein the information from the sending side includes, but not limited to, the indexes L ($i_1, i_2, \ldots, i_M$) of each antenna in the M antennae and indexes of the antenna groups, and is included in system or control information proprietary to a cell or a terminal.

Step 2: channel information Y between the M antennae and a receiving antenna is acquired.

Specifically, the receiving side acquires channel information $y_1$ between the first antenna in the M antennae and the receiving antenna according to reference data of the first antenna and received data at a reference signal resource location of the first antenna in the M antennae, acquires channel information $y_2$ between the second antenna in the M antennae and the receiving antenna according to reference data of the second antenna and received data at a reference signal resource location of the second antenna in the M antennae and the receiving antenna, acquires, in the same manner, channel information $y_M$ between the Mth antenna in the M antennae and the receiving antenna according to reference data of the Mth antenna and received data at a reference signal resource location of the Mth antenna in the M antennae, and finally acquires the channel information Y between the M antennae and the receiving antenna, the channel information Y being a combination of the channel information between each antenna in the M antennae and the receiving antennae, i.e., $$Y=[y_1, y_2, \ldots, y_M]^T.$$

Step 3: a unitary matrix W with a dimension of N×N is acquired.

1: A predetermined unitary matrix W with the dimension of N×N is acquired.

The unitary matrix W with the dimension of N×N is a DFT matrix, that is, elements of the unitary matrix W meet the following formula:

$$W_{pq} = C \cdot \exp\left(j2\pi \frac{(p-1)(q-1)}{N}\right);$$
$$p = 1, 2, \ldots, N;$$
$$q = 1, 2, \ldots, N$$

where subscript p and subscript q in the formula represent a row index and a column index of the unitary matrix W respectively, and C is a normalized constant factor.

2: The unitary matrix W with the dimension of N×N is acquired by receiving information from the sending side.

Specifically, the information from the sending side is included in system or control information proprietary to a cell or a terminal, and includes, but not limited to, an antenna element number $N_v$ in a vertical direction, an antenna element number $N_h$ in a horizontal direction, a polarized antenna element indicator and related information about a polarized matrix $W_{pol}$.

The unitary matrix W with the dimension of N×N is a kronecker product of a DFT matrix $W_v$ in the vertical direction, the polarized matrix $W_{pol}$ and a DFT matrix $W_h$ in the horizontal direction; a specific formula is as follows:

$$W = W_v \otimes W_{pol} \otimes W_h$$

where $W_v$ is the DFT matrix with a dimension of $N_v \times N_v$ in the vertical direction, $W_h$ is the DFT matrix with a dimension of $N_h \times N_h$ in the horizontal direction, and $N_v$ and $N_h$ are the number of antenna elements in the vertical direction and the horizontal direction respectively. For a single-polarized antenna element, $W_{pol}$ is a scalar "1"; and for a dual-polarized antenna element, $W_{pol}$ is a polarized matrix with a dimension of 2×2. Note: for a single-polarized antenna element, it is met that the product of $N_v$ and $N_h$ is N; and for a dual-polarized antenna element, it is met that twice of the product of $N_v$ and $N_h$ is N.

Step 4: an estimate S' of channel information S between the N antennae and the receiving antenna is acquired according to the indexes L of the M antennae, the channel information Y between the M antennae and the receiving antenna and the unitary matrix W with the dimension of N×N.

Specifically, a random matrix P is acquired according to the indexes L of the M antennae at first, the random matrix P meeting the following characteristics that: a dimension is M×N, the $i_m$th (m=1, 2, 3, . . . , M) element in the mth row of the random matrix P is 1 and other elements are 0, wherein $i_m$ is an antenna index of the mth antenna in the M antennae; then, a vector X is acquired according to the random matrix P, the unitary matrix W and the channel information Y between the M antennae and the receiving antenna, the vector X being a vector with a smallest norm in a vector set and the norm referring to a sum of absolute values of all elements of the vector, wherein any vector $V_i$ in the vector set $\{V_1, \ldots, V_i, \ldots, V_K\}$ meets that: the product of the random matrix P, the unitary matrix W or the conjugate transpose of the unitary matrix W and the vector $V_i$ is equal to the channel information Y between the M antennae and the receiving antenna, and X may be represented by a formula as follows:

$$X = \min_{V_i} \|V_i\|,$$

s.t $$Y = PWV_i$$

or $$Y = PW^H V_i$$

where $\|\cdot\|$ represents the operation of calculating a norm of a vector, s.t is a constraint condition mark, H represents the operation of calculating the conjugate transpose of a matrix, and min(x) represents calculation of a variable value by which a value of X is minimized; and finally, the estimate S' of the channel information S between the N antennae and the receiving antenna is acquired according to the vector X and the unitary matrix W, wherein the estimate S' of the channel information S between the N antennae and the receiving antenna is equal to the product of the unitary matrix W or the conjugate transpose of the unitary matrix W and the vector X, and may be represented by a formula as follows:

$$S'=WX \text{ or } S'=W^H X.$$

The sending side refers to a network side, and the receiving side refers to a terminal side.

Embodiment 1

Figure 8:
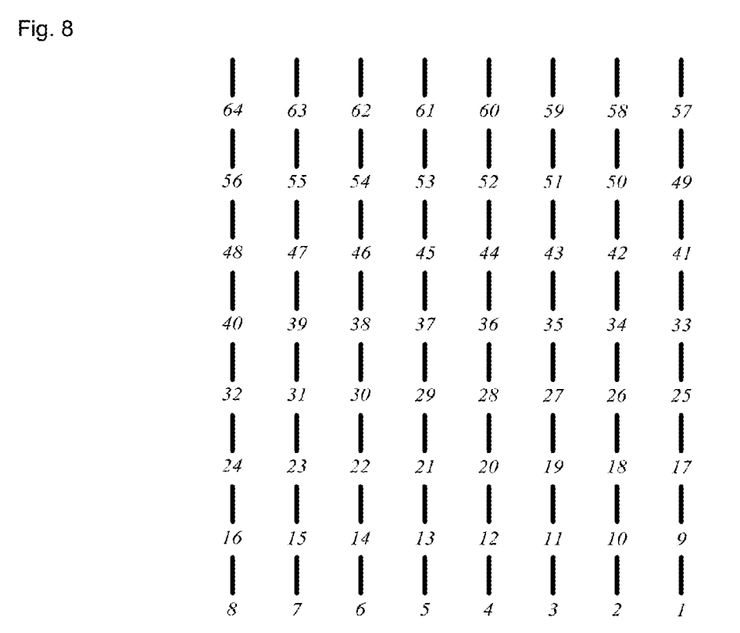
FIG. 8 is a diagram of antenna indexes of a single-polarized antenna array with a dimension of 8×8 according to an embodiment of the present disclosure.

It is assumed that a network side uses a single-polarized antenna array with a dimension of 8×8, the number N of antennae of the network side is 8×8=64. FIG. 8 is a diagram of antenna indexes of a single-polarized antenna array with a dimension of 8×8 according to an embodiment of the present disclosure. As shown in FIG. 8, it is supposed that the number M of antennae which send reference signals is 10 (<<64).

It is supposed that a terminal side uses one receiving antenna.

The terminal side acquires intrinsic indexes L of the 10 antennae which send reference signals, or acquires the indexes L of the 10 antennae which send reference signals in a predetermined manner, or acquires the indexes L of the 10 antennae which send reference signals by receiving information from the network side, and it is supposed that the acquired indexes L of the 10 antennae are as follows:
L={7,15,19,28,34,38,42,47,50,55}.

It is supposed that reference data of each antenna in the 10 antennae is a random sequence which is proprietary to the antenna and has an element modulus value of "1", the number of reference signal resource locations of each antenna is equal to the length of the reference data (or the random sequence), different antennae in the 10 antennae use the same or different reference signal resource locations, and for different antennae using the same reference signal resource locations, their reference data (random sequences) is orthogonal or approximately orthogonal, wherein the reference data is data which is sent at the reference signal resource locations and is known to a sender and a receiver, and the reference signal resource locations are time and/or frequency resource locations where the reference signals are sent.

The terminal side acquires channel information $y_1$ between the first antenna in the 10 antennae and the receiving antenna according to the reference data of the first antenna and received data at the reference signal resource locations of the first antenna in the 10 antennae, and specifically, the channel information $y_1$ between the first antenna and the receiving antenna is an element mean value of vectors obtained by multiplying the conjugate of the reference data of the first antenna with the received data at the reference signal resource locations of the antenna upon element; similarly, channel information $(y_2, y_3, \ldots, y_{10})$ between the other 9 antennae in the 10 antennae and the receiving antenna is acquired in the same manner; and channel information Y between the 10 antennae and the receiving antenna is a combination of the channel information between each antenna in the 10 antennae and the receiving antenna, i.e.

$$Y=[y_1,y_2,\ldots,y_{10}]^T,$$

where T represents operation of calculating the transpose of a matrix.

The terminal side acquires a predetermined unitary matrix W with a dimension of 64×64, and its elements meet:

$$W_{pq} = \frac{1}{\sqrt{64}} \cdot \exp\left(j2\pi \frac{(p-1)(q-1)}{64}\right);$$

$$p = 1, 2, \ldots, 64;$$

$$q = 1, 2, \ldots, 64$$

where subscript p and subscript q represent a row index and a column index of the unitary matrix W respectively.

Or, the terminal side acquires the unitary matrix W with the dimension of 64×64 by receiving information from the network side, and the unitary matrix W with the dimension of 64×64 is a kronecker product of a DFT matrix in a vertical direction, a polarized matrix and a DFT matrix in a horizontal direction, and a formula is as follows:

$$W=W_v \otimes W_{pol} \otimes W_h$$

where $W_v$ is a DFT matrix with a dimension of 8×8 in the vertical direction, and its elements meet:

$$W_{v,pq} = \frac{1}{\sqrt{8}} \cdot \exp\left(j2\pi \frac{(p-1)(q-1)}{8}\right);$$

-continued $p = 1, 2, \ldots, 8;$ $q = 1, 2, \ldots, 8;$ where, $W_h$ is a DFT matrix with a dimension of 8×8 in the horizontal direction, and its elements meet:

$$W_{h,pq} = \frac{1}{\sqrt{8}} \cdot \exp\left(j2\pi \frac{(p-1)(q-1)}{8}\right);$$

$p = 1, 2, \ldots, 8;$ $q = 1, 2, \ldots, 8;$ and where, $W_{pol}$ is a scalar "1".

According to the known indexes L of the 10 antennae, the terminal side acquires a random matrix P with a dimension of 10×64, wherein the 7th element in the 1th row of the random matrix P is "1", and other elements are 0"; the 15th element in the 2nd row is "1", and other elements are 0"; the 19th element in the 3rd row is "1", and other elements are 0"; the 28th element in the 4th row is "1", and other elements are 0", and so on, the 55th elements in the 10th row is "1", and other elements are 0". Then, the terminal side acquires a vector X according to the random matrix P, the unitary matrix W and the channel information Y between the 10 antennae and the receiving antenna, the vector X being a vector with a smallest norm in a vector set $\{V_1, \ldots, V_i, \ldots, V_K\}$ and any vector $V_i$ in the vector set $\{V_1, \ldots, V_i, \ldots, V_K\}$ meeting that: the product of the random matrix P, the unitary matrix W or the conjugate transpose of the unitary matrix W and the vector $V_i$ is equal to the channel information Y between the 10 antennae and the receiving antenna, wherein the norm refers to the sum of absolute values of all elements of the vector, and X may be represented by a formula as follows:

$$X = \min_{V_i} \|V_i\|,$$

s.t $$Y = PWV_i$$

or $$Y = PW^H V_i$$

where $\|\cdot\|$ represents operation of calculating a norm of a vector, s.t is a constraint condition mark, H represents operation of calculating the conjugate transpose of a matrix and min(x) represents calculation of a variable value by which a value of X is minimized.

The terminal side acquires an estimate S' of channel information S between the 64 antennae and the receiving antenna according to the vector X and the unitary matrix W, wherein the estimate S' of the channel information S between the 64 antennae and the receiving antenna is equal to the product of the unitary matrix W or the conjugate transpose of the unitary matrix W and the vector X, and may be represented by a formula as follows:

$S' = WX$ or $S' = W^H X.$

Embodiment 2

Figure 9:
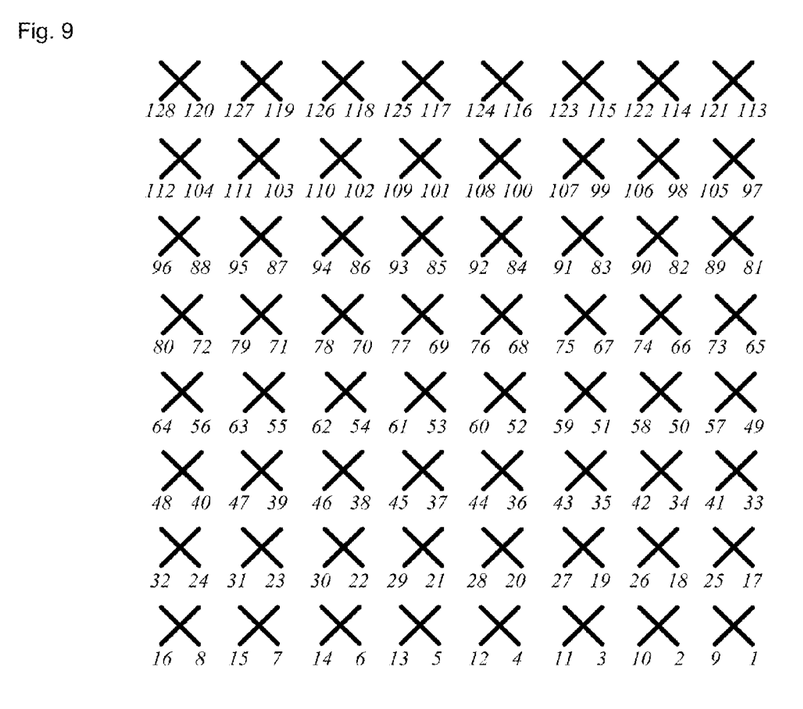
FIG. 9 is a diagram of antenna indexes of a dual-polarized antenna array with a dimension of 8×8 according to an embodiment of the present disclosure.

It is supposed that a network side uses a dual-polarized antenna array with a dimension of 8×8, the number N of antennae of the network side is 2×8×8=128. FIG. 9 is a diagram of antenna indexes of a dual-polarized antenna array with a dimension of 8×8 according to an embodiment of the present disclosure. As shown in FIG. 9, it is supposed that the number M of antennae which send reference signals is 20 (<<128).

It is supposed that a terminal side uses one receiving antenna.

The terminal side acquires intrinsic indexes L of the 20 antennae which send reference signals, or acquires the indexes L of the 20 antennae which send reference signals in a predetermined manner, or acquires the indexes L of the 20 antennae which send reference signals by receiving information from the network side, and it is supposed that the acquired indexes L of the 20 antennae are as follows:

L={7,17,24,32,35,44,49,57,64,66,70,79,86,92,98,103, 113,117,121,126}.

It is supposed that reference data of each antenna in the 20 antennae is a random sequence which is proprietary to the antenna and has an element modulus value of "1", the number of reference signal resource locations of each antenna is equal to the length of the reference data (or the random sequence), different antennae in the 20 antennae use the same or different reference signal resource locations, and for different antennae using the same reference signal resource locations, their reference data (random sequences) is orthogonal or approximately orthogonal, wherein the reference data is data which is sent at the reference signal resource locations and is known to a sender and a receiver, and the reference signal resource locations are time and/or frequency resource locations where the reference signals are sent.

The terminal side acquires channel information $y_1$ between the first antenna in the 20 antennae and the receiving antenna according to the reference data of the first antenna and received data at the reference signal resource locations of the first antenna in the 20 antennae, and specifically, the channel information $y_1$ between the first antenna and the receiving antenna is an element mean value of vectors obtained by multiplying the conjugate of the reference data of the first antenna with the received data at the reference signal resource locations of the antenna upon element; similarly, channel information $(y_2, y_3, \ldots, y_{20})$ between the other 19 antennae in the 20 antennae and the receiving antenna is acquired in the same manner; and channel information Y, acquired by the terminal side, between the 20 antennae and the receiving antenna is a combination of the channel information between each antenna in the 20 antennae and the receiving antenna, i.e.

$Y = [y_1, y_2, \ldots, y_{20}]^T,$ where T represents operation of calculating the transpose of a matrix.

A predetermined unitary matrix W with a dimension of 128×128 is acquired, and its elements meet:

$$W_{pq} = \frac{1}{\sqrt{128}} \cdot \exp\left(j2\pi \frac{(p-1)(q-1)}{128}\right);$$

$p = 1, 2, \ldots, 128;$ $q = 1, 2, \ldots, 128$ where subscript p and subscript q represent a row index and a column index of the unitary matrix W respectively.

Or, the terminal side acquires the unitary matrix W with the dimension of 128×128 by receiving information from the network side, and the unitary matrix W with the dimension of 128×128 is a kronecker product of a DFT matrix in a vertical direction, a polarized matrix and a DFT matrix in a horizontal direction, and a formula is as follows:

$$W = W_v \otimes W_{pol} \otimes W_h$$

where $W_v$ is a DFT matrix with a dimension of 8×8 in the vertical direction, and its elements meet:

$$W_{v,pq} = \frac{1}{\sqrt{8}} \cdot \exp\left(j2\pi \frac{(p-1)(q-1)}{8}\right);$$
$$p = 1, 2, \ldots, 8;$$
$$q = 1, 2, \ldots, 8;$$

where, $W_h$ is a DFT matrix with a dimension of 8×8 in the horizontal direction, and its elements meet:

$$W_{h,pq} = \frac{1}{\sqrt{8}} \cdot \exp\left(j2\pi \frac{(p-1)(q-1)}{8}\right);$$
$$p = 1, 2, \ldots, 8;$$
$$q = 1, 2, \ldots, 8;$$

and where, $W_{pol}$ is a polarized matrix with a dimension of 2×2, and it is supposed that:

$$W_{pol} = \frac{1}{\sqrt{2}}\begin{bmatrix} 1 & 1 \\ j & -j \end{bmatrix}.$$

According to the known indexes L of the 20 antennae, the terminal side acquires a random matrix P with a dimension of 20×128, wherein the 7th element in the 1st row of the random matrix P is "1", and other elements are 0"; the 17th element in the 2nd row is "1", and other elements are 0"; the 24th element in the 3rd row is "1", and other elements are 0"; the 32nd element in the 4th row is "1", and other elements are 0"; and following the same rule, the 126th elements in the 20th row is "1", and other elements are 0". Then, the terminal side acquires a vector X according to the random matrix P, the unitary matrix W and the channel information Y between the 20 antennae and the receiving antenna, wherein the vector X is a vector with a smallest norm in a vector set $\{V_1, \ldots, V_i, \ldots, V_K\}$ and any vector $V_i$ in the vector set $\{V_1, \ldots, V_i, \ldots, V_K\}$ meets that: the product of the random matrix P, the unitary matrix W or the conjugate transpose of the unitary matrix W and the vector $V_i$ is equal to the channel information Y between the 20 antennae and the receiving antenna, wherein the norm refers to the sum of absolute values of all elements of the vector, and X may be represented by a formula as follows:

$$X = \min_{V_i} \|V_i\|,$$
s.t
$$Y = PWV_i$$

or
$$Y = PW^H V_i$$

where $\|\cdot\|$ represents operation of calculating a norm of a vector, s.t is a constraint condition mark, H represents operation of calculating the conjugate transpose of a matrix and min(x) represents calculation of a variable value by which a value of X is minimized.

The terminal side acquires an estimate S' of channel information S between the 128 antennae and the receiving antenna according to the vector X and the unitary matrix W, wherein the estimate S' of the channel information S between the 128 antennae and the receiving antenna is equal to the product of the unitary matrix W or the conjugate transpose of the unitary matrix W and the vector X, and may be represented by a formula as follows:

$$S' = WX \text{ or } S' = W^H X.$$

An embodiment of the present disclosure further provides a computer-readable storage medium, which includes a set of computer-executable instructions, the instructions being configured to execute the method for acquiring channel information of the embodiment of the present disclosure.

Those skilled in the art should know that the embodiments of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto a computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred embodiments of the present disclosure and not intended to limit the present disclosure. For those skilled in the art, the present disclosure may have various modifications and variations. Any modification, equivalent replacement, improvement and the like made within the spirit and principle of the present disclosure shall fall within the scope of protection of the present disclosure.

Although the present disclosure is described above in detail, the present disclosure is not limited to the above description, and those skilled in the art may make various modifications according to the principle of the present disclosure. Therefore, all modifications made according to the principle of the present disclosure shall be understood to fall within the scope of protection of the present disclosure.

What is claimed is:

1. A method for acquiring channel information, comprising:
    acquiring, by a receiving side, indexes L of M antennae which send reference signals in N antennae of a sending side, wherein the M is less than the N;
    acquiring channel information Y between the M antennae and a receiving antenna of the receiving side according to received data at a resource location of a reference signal and reference data, wherein the reference data is transmitted data at the resource location of a reference signal of each antenna in the M antennae of the receiving side;
    acquiring a unitary matrix W with a dimension of N×N; and
    determining an estimate S' of channel information S between the N antennae of the sending side and the receiving antenna of the receiving side by virtue of the indexes L, the unitary matrix W and the channel information Y.

2. The method according to claim 1, wherein the step of acquiring, by the receiving side, the indexes L of the M antennae which send the reference signals in the N antennae of the sending side comprises:
    acquiring, by the receiving side, intrinsic indexes L of the M antennae, or acquiring the indexes L of the M antennae according to time and frequency resource locations or according to time resource locations or according to frequency resource locations, or acquiring the indexes L of the M antennae through first system or control information from the sending side.

3. The method according to claim 2, wherein the receiving side directly acquires the indexes L of the M antennae from the first system or control information, or acquires the indexes L of the M antennae through antenna array indexes in the first system or control information.

4. The method according to claim 1, wherein the step of acquiring the channel information Y between the M antennae and the receiving antenna of the receiving side comprises:
    acquiring, by the receiving side, channel information $\{y_1, y_2, \ldots, y_M\}$ between each antenna in the M antennae and the receiving antenna according to the reference data and the received data; and
    combining the channel information $\{y_1, y_2, \ldots, y_M\}$ between each antenna in the M antennae and the receiving antenna to obtain the channel information Y.

5. The method according to claim 1, wherein the step of acquiring the unitary matrix W with the dimension of N×N comprises:
    acquiring, by the receiving side, the unitary matrix W which is predetermined, or determining the unitary matrix W through second system or control information from the sending side.

6. The method according to claim 5, wherein the unitary matrix W which is predetermined is a Discrete Fourier Transform (DFT) matrix with a dimension of N×N, and each element of the unitary matrix W is:

$$W_{pq} = C \cdot \exp\left(j2\pi \frac{(p-1)(q-1)}{N}\right);$$
$$p = 1, 2, \ldots, N;$$
$$q = 1, 2, \ldots, N$$

where p and q represent a row index and a column index of the unitary matrix W respectively, and C is a normalized constant factor.

7. The method according to claim 5, wherein the second system or control information comprises an antenna element number $N_v$ in a vertical direction, an antenna element number $N_h$ in a horizontal direction, a polarized antenna element indicator and related information about a polarized matrix $W_{pol}$.

8. The method according to claim 7, wherein the step of determining the unitary matrix W through the second system or control information from the sending side comprises:
    determining the unitary matrix W with the dimension of N×N by calculating a kronecker product of a DFT matrix $W_v$ with a dimension of $N_v \times N_v$ in the vertical direction, the polarized matrix $W_{pol}$ and a DFT matrix $W_h$ with a dimension of $N_h \times N_h$ in the horizontal direction;
    wherein when it is determined, according to the polarized antenna element indicator, that the N antennae of the sending side are single-polarized antenna elements, a product of $N_v$ and $N_h$ is N and $W_{pol}$ is a scalar 1; and when it is determined, according to the polarized antenna element indicator, that the N antennae of the sending side are dual-polarized antenna elements, twice of the product of $N_v$ and $N_h$ is N and $W_{pol}$ is a polarized matrix with a dimension of 2×2.

9. The method according to claim 1, wherein the step of determining the estimate S' of the channel information S between the N antennae of the sending side and the receiving antenna of the receiving side by virtue of the indexes L, the unitary matrix W and the channel information Y comprises:
    acquiring, by the receiving side, a random matrix P with a dimension of M×N by virtue of the indexes L;
    determining a vector X by virtue of the random matrix P, the unitary matrix W and the channel information Y; and
    determining the estimate S' of the channel information S between the N antennae and the receiving antenna by virtue of the unitary matrix W and the vector X.

10. The method according to claim 9, wherein an $i_m$th element in an mth row of the random matrix P is 1 and other elements are 0, wherein the $i_m$ is an antenna index of the mth antenna in the M antennae, and m=1, 2, . . . , M.

11. The method according to claim 10, wherein the vector X is a vector with a smallest norm in a vector set $\{V_1, V_2, \ldots, V_K\}$, wherein any vector $V_i$ in the vector set $\{V_1,$ $V_2, \ldots, V_K\}$ meets that: a product of the random matrix P, the unitary matrix W or a conjugate transpose of the unitary matrix W and the vector $V_i$ is equal to the channel information Y, and the norm is a sum of absolute values of all elements of the vector.

12. The method according to claim 9, wherein determining the estimate S' of the channel information S between the N antennae and the receiving antenna by virtue of the unitary matrix W and the vector X comprises:
determining the estimate S' of the channel information S between the N antennae and the receiving antenna by calculating a product of the unitary matrix W or a conjugate transpose of the unitary matrix W and the vector X.

13. A device for acquiring channel information, comprising a memory for storing programming instructions and a processor, wherein the processor is configured to be capable of executing the stored programming instructions to perform steps comprising:
acquiring indexes L of M antennae which send reference signals in N antennae of a sending side, wherein the M is less than the N, acquiring channel information Y between the M antennae and a receiving antenna of a receiving side according to received data at a resource location of a reference signal and reference data, wherein the reference data is transmitted data at the resource location of a reference signal of each antenna in the M antennae of the receiving side, and acquiring a unitary matrix W with a dimension of N×N; and
determining an estimate S' of channel information S between the N antennae of the sending side and the receiving antenna of the receiving side by virtue of the indexes L, the unitary matrix W and the channel information Y.

14. The device according to claim 13,
the processor is configured to be capable of executing the stored programming instructions to perform steps comprising:
acquiring intrinsic indexes L of the M antennae, or acquiring the indexes L of the M antennae according to time and frequency resource locations or according to time resource locations or according to frequency resource locations, or acquiring the indexes L of the M antennae through first system or control information from the sending side;
acquiring channel information $\{y_1, y_2, \ldots, y_M\}$ between each antenna in the M antennae and the receiving antenna according to the reference data and the received data, and combining the channel information $\{y_1, y_2, \ldots, y_M\}$ between each antenna in the M antennae and the receiving antenna to obtain the channel information Y; and
acquiring the unitary matrix W which is predetermined, or determining the unitary matrix W through second system or control information from the sending side.

15. The device according to claim 14, wherein the second system or control information comprises an antenna element number $N_v$ in a vertical direction, an antenna element number $N_h$ in a horizontal direction, a polarized antenna element indicator and related information about a polarized matrix $W_{pol}$.

16. The device according to claim 15, wherein
the processor is configured to be capable of executing the stored programming instructions to perform steps comprising:
determining the unitary matrix W with the dimension of N×N by calculating a kronecker product of a Discrete Fourier Transform (DFT) matrix $W_v$ with a dimension of $N_v \times N_v$ in the vertical direction, the polarized matrix $W_{pol}$ and a DFT matrix $W_h$ with a dimension of $N_h \times N_h$ in the horizontal direction,
wherein when it is determined, according to the polarized antenna element indicator, that the N antennae of the sending side are single-polarized antenna elements, a product of $N_v$ and $N_h$ is N and $W_{pol}$ is a scalar 1; and when it is determined, according to the polarized antenna element indicator, that the N antennae of the sending side are dual-polarized antenna elements, twice of the product of $N_v$ and $N_h$ is N and $W_{pol}$ is a polarized matrix with a dimension of 2×2.

17. The device according to claim 13, wherein the processor is configured to be capable of executing the stored programming instructions to perform steps comprising:
acquiring a random matrix P with a dimension of M×N by virtue of the indexes L;
determining a vector X by virtue of the random matrix P, the unitary matrix W and the channel information Y; and
determining the estimate S' of the channel information S between the N antennae and the receiving antenna by virtue of the unitary matrix W and the vector X.

18. The device according to claim 17, wherein an $i_m$th element in an mth row of the random matrix P is 1 and other elements are 0, wherein the $i_m$ is an antenna index of the mth antenna in the M antennae, and $m=1, 2, \ldots, M$.

19. The device according to claim 18, wherein the vector X is a vector with a smallest norm in a vector set $\{V_1, V_2, \ldots, V_K\}$, wherein any vector $V_i$ in the vector set $\{V_1, V_2, \ldots, V_K\}$ meets that: a product of the random matrix P, the unitary matrix W or conjugate transpose of the unitary matrix W and the vector $V_i$ is equal to the channel information Y, and the norm is a sum of absolute values of all elements of the vector.

20. The device according to claim 17, wherein the processor is configured to be capable of executing the stored programming instructions to perform steps comprising determining the estimate S' of the channel information S between the N antennae and the receiving antenna by calculating a product of the unitary matrix W or a conjugate transpose of the unitary matrix W and the vector X.

21. A non-transitory computer-readable storage medium, comprising a set of computer-executable instructions, the instructions being configured to execute a method for acquiring channel information, wherein the method comprises:
acquiring, by a receiving side, indexes L of M antennae which send reference signals in N antennae of a sending side, wherein the M is less than the N;
acquiring channel information Y between the M antennae and a receiving antenna of the receiving side;
acquiring a unitary matrix W with a dimension of N×N according to received data at a resource location of a reference signal and reference data, wherein the reference data is transmitted data at the resource location of a reference signal of each antenna in the M antennae of the receiving side; and
determining an estimate S' of channel information S between the N antennae of the sending side and the receiving antenna of the receiving side by virtue of the indexes L, the unitary matrix W and the channel information Y.

* * * * *